United States Patent
Ward, II

(10) Patent No.: US 9,652,724 B2
(45) Date of Patent: May 16, 2017

(54) PERMIT COMPLIANCE SYSTEM

(71) Applicant: James Tyler Ward, II, Williston, VT (US)

(72) Inventor: James Tyler Ward, II, Williston, VT (US)

(*) Notice: Subject to any disclaimer, the term of this patent is extended or adjusted under 35 U.S.C. 154(b) by 0 days.

(21) Appl. No.: 14/454,458

(22) Filed: Aug. 7, 2014

(65) Prior Publication Data

US 2015/0046977 A1 Feb. 12, 2015

Related U.S. Application Data

(60) Provisional application No. 61/863,461, filed on Aug. 8, 2013.

(51) Int. Cl.
*G06Q 10/02* (2012.01)
*G06Q 10/06* (2012.01)
*G06Q 50/28* (2012.01)

(52) U.S. Cl.
CPC ............. *G06Q 10/02* (2013.01); *G06Q 10/06* (2013.01); *G06Q 50/28* (2013.01)

(58) Field of Classification Search
CPC ........ G06Q 10/02; G06Q 50/28; G06Q 10/06; G06Q 10/063; G06Q 10/0639; G06F 21/552; G06F 21/554; G06F 21/577; H04L 63/102; H04L 63/107
USPC .................................................... 726/1-4, 21
See application file for complete search history.

(56) References Cited

U.S. PATENT DOCUMENTS

| | | | | |
|---|---|---|---|---|
| 7,974,853 | B1* | 7/2011 | Zimmerman | G06Q 10/04 705/1.1 |
| 9,076,106 | B2* | 7/2015 | Motukuri | G06N 5/048 |
| 2004/0143467 | A1* | 7/2004 | McAllister | G06Q 40/04 705/37 |
| 2006/0043025 | A1* | 3/2006 | Theodore | C02F 1/66 210/724 |
| 2006/0178145 | A1* | 8/2006 | Floam | H04W 24/00 455/434 |

(Continued)

OTHER PUBLICATIONS

Perry S. Goldschein, Going Mobile: Emissions Trading Getd a Boost From Mobile Source Emission Reduction Credits, Journal of Environmental Law, vol. 13:225, 1995.*

*Primary Examiner* — Shanto M Abedin
(74) *Attorney, Agent, or Firm* — Justin W. McCabe; Dunkiel Saunders Elliott Raubvogel & Hand, PLLC

(57) ABSTRACT

A system and method is disclosed that enables the display of permits and/or permit information related to a specific location, collection of permitting data onsite, comparison of the onsite data to permitted constraints, and reporting the results of the inspection (as required under the appropriate regulatory policy or as requested by the organization or entity being inspected), as well as sending immediate notifications, as appropriate, to decision makers. In certain embodiments, the system and method may also offer predictions on the likelihood of an enforcement action against the organization given factors such as, but not limited to, the type of violation, degree of violation, and enforcement actions against others for similar violations. In other embodiments, the system and method allows the permittee to mitigate the risk of a violation by notifying emergency personnel in addition to decision makers within the organization.

15 Claims, 7 Drawing Sheets

(56) References Cited

U.S. PATENT DOCUMENTS

| | | | | |
|---|---|---|---|---|
| 2007/0163965 A1* | 7/2007 | Wolfe | .................. | C02F 1/008 |
| | | | | 210/739 |
| 2008/0177563 A1* | 7/2008 | Zimmerman | .......... | G06Q 10/04 |
| | | | | 705/1.1 |
| 2009/0070047 A1* | 3/2009 | Swanson | ................ | G05B 17/02 |
| | | | | 702/32 |
| 2009/0234698 A1* | 9/2009 | Watson | ................ | G06Q 10/06 |
| | | | | 705/7.28 |
| 2009/0265756 A1* | 10/2009 | Zhang | .................. | G06F 21/53 |
| | | | | 726/1 |
| 2011/0133927 A1* | 6/2011 | Humphrey | ............ | A62B 9/006 |
| | | | | 340/539.11 |
| 2012/0216106 A1 | 8/2012 | Casey | | |
| 2013/0285839 A1* | 10/2013 | Comen | ................ | G06Q 10/06 |
| | | | | 340/870.16 |
| 2014/0156584 A1* | 6/2014 | Motukuri | ............ | G06Q 10/06 |
| | | | | 706/52 |
| 2014/0180559 A1* | 6/2014 | Light-Holets | ....... | F02D 41/0025 |
| | | | | 701/102 |
| 2014/0330615 A1* | 11/2014 | Dumouchel | ....... | G06Q 10/0635 |
| | | | | 705/7.28 |

\* cited by examiner

PERMIT COMPLIANCE SYSTEM

RELATED APPLICATIONS

This application claims the benefit of priority of U.S. Provisional Patent Application No. 51/863,461 filed Aug. 8, 2013, and titled "Permit Compliance System", which is incorporated by reference in its entirety.

FIELD OF THE INVENTION

The present invention generally relates to monitoring and reporting systems. In particular, the present invention is directed to a permit compliance system.

BACKGROUND

Compliance officers, such as environmental compliance officers, typically gather information about effluents, emissions, exhausts, etc., coming from a plant or facility based on issued permits from state, federal, or local agencies for that plant or facility. For certain organizations, especially those with multiple sites in various jurisdictions, the permitting requirements may vary widely, thus requiring the compliance officer to negotiate the differences between each permitted site as the officer travels from site to site collecting the information needed for the particular reporting they do (environmental compliance, construction compliance, safety inspections, and any other location-based reporting). After collecting the information, the compliance officer will return to their office to report the data and, at least in the case of environmental permits, compare the data to the permitted effluent/exhaust limitations. Once reported and compared, the data may need to be reported to the relevant agency, and in the case of a violation or potential or possible violation, the information also needs to be transmitted to a responsible party/decision maker.

As is evident, the process of obtaining, recording, comparing, and transmitting compliance data is prone to inaccuracies, fraudulent activities, and delays that may put the organization or human lives at risk. Furthermore, there is no ability to audit when and where the data was collected, i.e., the actual GPS location and the date and time on which the data was gathered, and if all the data was collected at the same time. As such, there is no way to guarantee that the inspection was actually performed on-site (i.e., at a location that was part of the site inspection) or was manipulated to avoid compliance issues. Due to the significant opportunities for error and/or outright fraud in the current methods for collecting and processing inspection data, companies are at risk for possible penalties and fines for noncompliance or for not responding quickly (enough) to problem areas.

SUMMARY OF THE DISCLOSURE

In a first exemplary aspect there is disclosed a permit compliance system for monitoring a sites compliance with one or more permits limiting or controlling the activities and/or discharges from the site, the permit compliance system comprising a mobile compliance device having a processor and a non-transitory computer readable medium in communication with the processor, wherein the non-transitory computer readable medium includes: an input module configured to: determine a location of the mobile compliance device and one or more permit limitations related to the location, wherein each of the one or more permit limitations includes a permitted discharge value; and receive data for each of the one or more permit limitations representing an actual discharge; a comparison module configured to determine a difference between the actual discharge with the permitted discharge value; and a prediction module configured to determine a likelihood of an enforcement action based upon the difference.

In another exemplary aspect there is disclosed a permit compliance system for monitoring, reporting, and complying with permit limitations related to a site or a permitted discharge, the permit compliance system comprising a mobile compliance device having a processor and a non-transitory computer readable medium in communication with the processor, the mobile compliance device configured to receive information related to a discharge; a database in communication with the mobile compliance device, the database including: one or more permits related to the site or the permitted discharge; records relating to past discharge activity at the site; and compliance credits earned or owned by the site; a reporting system in communication with the mobile compliance device and the database, the reporting system configured to: determine a discharge event; determine remedial steps based on the discharge event; transmit information related to the discharge event and the remedial steps.

In yet another exemplary aspect there is disclosed a method of limiting an organization's exposure to violations of a permit having permitted discharge values comprising receiving, as an input, information related to a discharge at the organization; comparing the discharge to the permitted discharge value contained within the permit regulating the organization; determining the extent to which the discharge exceeds the permitted discharge; predicting a risk value by evaluating the determining in conjunction with one or more of: a number of exceeded permit limitations; the extent; an amount of time the extent; a toxicity or dangerousness of the extent; how often enforcement actions are taken against industries related to the organization; how often the organization has had an enforcement action brought against it; number of enforcement actions in the surrounding geographical area; number of enforcement actions taken in that jurisdiction for similar noncompliance; cost of enforcement actions for similar noncompliance as the extent; and the speed with which the organization remedies the extent; and minimizing the organization's exposure based upon the evaluating.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A permit compliance system (PCS) according to the present disclosure enables the display of permits and/or permit information related to a specific location, collection of permitting data onsite, comparison of the onsite data to permitted constraints, and reporting the results of the inspection (as required under the appropriate regulatory policy or as requested by the organization or entity being inspected), as well as sending immediate notifications, as appropriate, to decision makers. In certain embodiments, a PCS according to the present disclosure may also offer predictions on the likelihood of an enforcement action against the organization given factors such as, but not limited to, the type of violation, degree of violation, and enforcement actions against others for similar violations. In other embodiments, a PCS according to the present disclosure allows the permittee to mitigate the risk of a violation by notifying emergency personnel in addition to decision makers within the organization.

Figure 1:
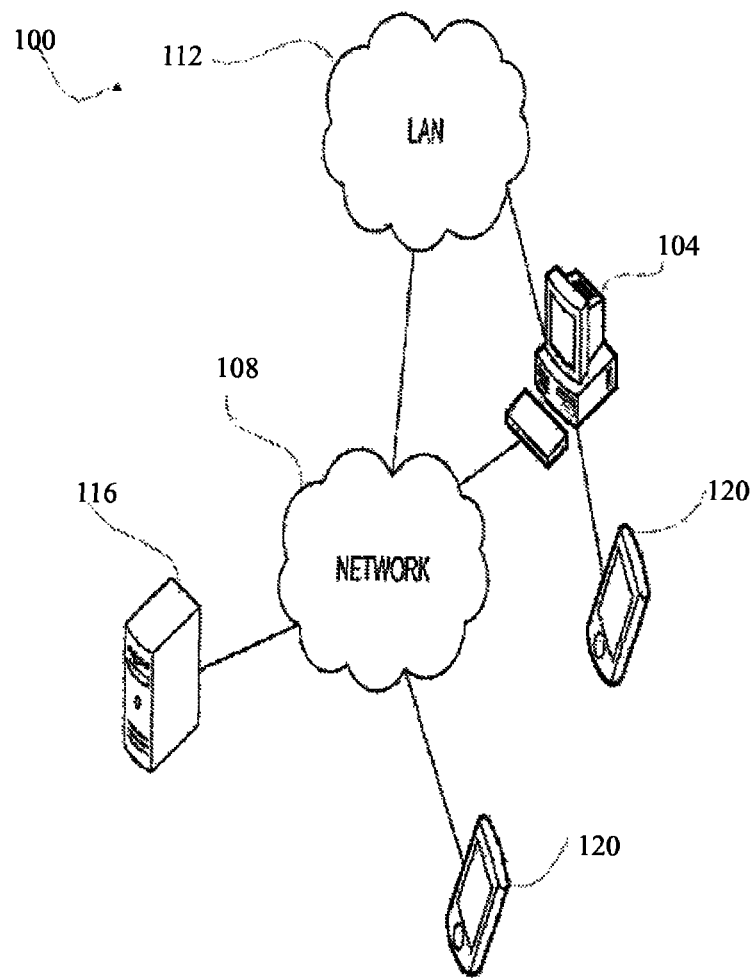
FIG. 1 is a schematic representation of an information system for use with a permit compliance system (PCS) according to an embodiment of the present invention.

Turning now to the figures, FIG. 1 schematically illustrates an embodiment of a system 100 used facilitate that operation of a PCS 200 (depicted in FIG. 2 and discussed below). System 100 may be used to communicate a wide variety of information within and external to PCS 200 including, but not limited to, permit information, compliance officer preferences, compliance officer situational factors, including time, date, weather, and compliance officer location.

System 100 may include a computing device 104, an information network 108, (such as the Internet), a local area network 112, a content source 116, and one or more mobile devices 120. Computing device 104 and mobile devices 120 may communicate through information network 108 (and/or local area network 112) in order to access information in content source 116. Content source 116 can be, for example, a non-transitory machine readable storage medium, a database, whether publicly accessible, privately accessible, or accessible through some other arrangement such as subscription, that holds permit related information, data, programs, algorithms, or computer code, thereby accessible by computing device 104, mobile devices 120, and PCS 200. Content source 116 can be updated or modified to include new or additional permit information, such as additional requirements, updated limitations, and the like. In an exemplary embodiment, permit information contained on content source 116 is not updatable or modifiable except by certain personnel and may only be accessible via a separate computing device 104 that is not available or accessible to the compliance officer.

As those skilled in the art will appreciate, computing device 104 may take a variety of forms, including, but not limited to, a web appliance, a laptop computer, a desktop computer, a computer workstation, a terminal computer, web-enabled televisions, media players, and other computing devices in communication with information network 108.

Information network 108 may be used in connection with system 100 to enable communication between the various elements of the system. For example, as indicated in FIG. 1, information network 108 may be used by computing device 104 to facilitate communication between content source 116 and the computing device, as well as mobile devices 120. Those skilled in the art will appreciate that computing device 104 may access information network 108 using any of a number of possible technologies including a cellular network, WiFi, wired internet access, combinations thereof, as well as others not recited, and for any of a number of purposes including, but not limited to, those reasons recited above.

As locations needing permit compliance may be relatively inaccessible by wireless transmissions, in an exemplary embodiment one or more of the modules included with PCS 200 (discussed in detail below with reference to FIG. 2) reside on computing device 104 or mobile devices 120. This configuration can allow a compliance officer to freely move throughout the facility to capture the appropriate information and to later upload the relevant data when connected to information network 108. Alternatively, communication between the modules included with PCS 200 may be initiated through a webpage instantiated in a web-based environment existing that is accessible through an information network, such as network 108. In this embodiment, if wireless Internet access is available, then the data may be transmitted to a database residing on a server. If wireless Internet access is not available, then the data can be saved locally (i.e., on computing device 104) until such time that wireless Internet access is available and/or the compliance officer attempts to send the saved data or a collection of saved data back to the server.

As noted above, PCS 200 includes one or more software modules configured to allow for the recall of permit information based on the location of the compliance officer; the input of emission, effluent, exhaust, discharge, or other permit monitoring requirements by the compliance officer via a computing device 104; the comparison of the input information to permit limitations; notification to decision makers based upon the comparison; and a prediction of possible enforcement action as a function of various factors. To simplify and control the recording of permit information, one or more of the modules included with PCS 200 determines the appropriate input based upon the place that the compliance officer is at. The location of the place may be any geolocatable position, but is generally associated with the structure, building, land, etc. that is subject to the permit.

Figure 2:
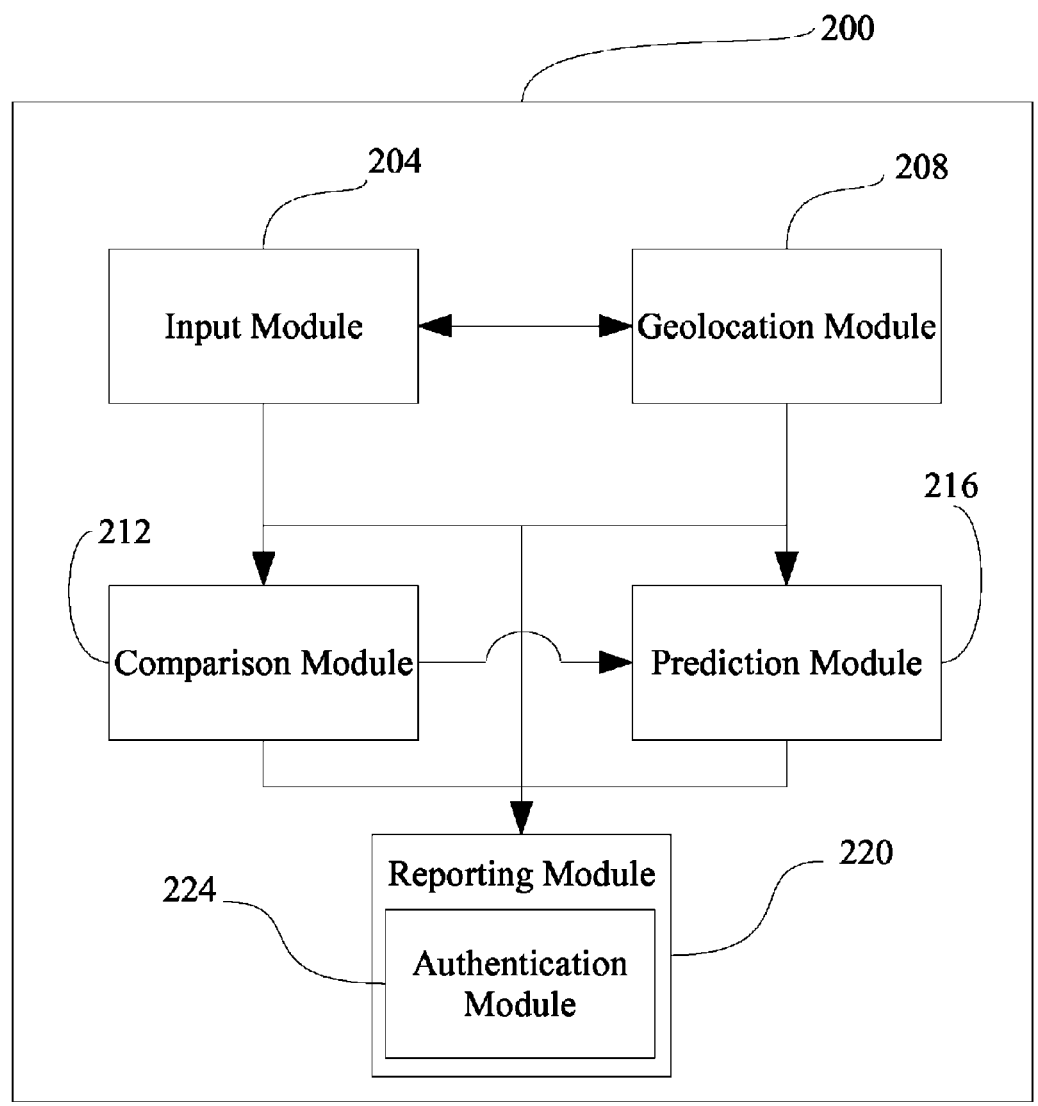
FIG. 2 is a block diagram of a PCS according to an embodiment of the present invention.

In the exemplary embodiment shown in FIG. 2, PCS 200 includes an input module 204, a geolocation module 208, a comparison module 212, a prediction module 216, and a reporting module 220. Input module 204 allows for inputting input data, e.g., monitoring information or values, from a compliance officer into PCS 200. Input data may include, but is not limited to, readings taken from a gauge, physical condition of a component, an environment defined as a safety issue, etc. In this embodiment, when PCS 200 is implemented using computing device 104, which can be, for example, a laptop computer, a desk top computer, a tablet, or other computing device capable of connecting to the Internet, input module 204 permits a compliance officer to input permit related information such as, but not limited to, those found in the following tables:

A.1 During the period beginning on the effective date and lasting through expiration, the permittee is authorized to discharge treated wastewater from outfall 001 to an unnamed tributary to the Blackstone River. Such discharges shall be limited and monitored by the permittee as specified below.

| EFFLUENT CHARACTERISTIC PARAMETER | EFFLUENT LIMITS | | | | | MONITORING REQUIREMENTS[2] | |
|---|---|---|---|---|---|---|---|
| | AVERAGE MONTHLY | AVERAGE WEEKLY | AVERAGE MONTHLY | AVERAGE WEEKLY | MAXIMUM DAILY | MEASUREMENT FREQUENCY | SAMPLE TYPE |
| FLOW[1] | **** | **** | 2.0 MGD | **** | Report MGD | CONTINUOUS | RECORDER |
| FLOW[1] | **** | **** | Report MGD | **** | *** | CONTINUOUS | RECORDER |
| $BOD_5$[3] | 167 lbs/Day | 167 lbs/Day | 10 mg/l | 10 mg/l | Report mg/l | 3/WEEK | 24-HR COMPOSITE[4] |
| TSS [3] | 167 lbs/Day | 167 lbs/Day | 10 mg/l | 10 mg/l | Report mg/l | 3/WEEK | 24-HR COMPOSITE[4] |
| pH Range[5] | 6.5-8.3 SU (SEE PERMIT PARAGRAPH I.A.1.b.) | | | | | 1/DAY | GRAB |
| ESCHERICHIA COLI [5,6] (April 1 to October 31) | **** | **** | 126 cfu/100 ml | *** | 409 cfu/100 ml | 3/WEEK | GRAB |
| ENTEROCOCCI [6,7] | **** | **** | 108 cfu/100 ml | **** | 350 cfu/100 ml | 1/WEEK | GRAB |
| TOTAL COPPER | **** | **** | 22 ug/l | **** | 32 ug/l | 1/MONTH | 24-HR COMPOSITE[4] |
| TOTAL ZINC | **** | **** | 58 ug/l | **** | 58 ug/l | 1/MONTH | 24-HR COMPOSITE[4] |
| TOTAL LEAD[8] | **** | **** | 0.9 ug/l | **** | Report ug/l | 1/MONTH | 24-HR COMPOSITE[4] |
| TOTAL CADMIUM[8] | **** | **** | 0.16 ug/l | **** | 0.94 ug/l | 1/MONTH | 24-HR COMPOSITE[4] |
| TOTAL ALUMINUM | **** | **** | 87 ug/l | **** | 844 ug/l | 1/MONTH | 24-HR COMPOSITE[4] |
| DISSOLVED OXYGEN[5] (April 1st-October 31st) | NOT LESS THAN 5.0 mg/l | | | | | 1/DAY | GRAB |

A.1 During the period beginning the effective date and lasting through expiration, the permittee is authorized to discharge treated wastewater from outfall 001 to an unnamed tributary to the Blackstone River. Such discharges shall be limited and monitored by the permittee as specified below.

| EFFLUENT CHARACTERISTIC PARAMETER | EFFLUENT LIMITS | | | | | MONITORING REQUIREMENTS[2] | |
|---|---|---|---|---|---|---|---|
| | AVERAGE MONTHLY | AVERAGE WEEKLY | AVERAGE MONTHLY | AVERAGE WEEKLY | MAXIMUM DAILY | MEASUREMENT FREQUENCY | SAMPLE TYPE |
| AMMONIA-NITROGEN (May 1-October 31) | 33.4 lbs/Day | 66.7 lbs/Day | 2 mg/l | 4 mg/l | Report mg/l | 1/WEEK | 24-HR COMPOSITE[4] |
| AMMONIA-NITROGEN (November 1-April 30) | 150 lbs/Day | 300 lbs/Day | 9 mg/l | 18 mg/l | Report mg/l | 1/WEEK | 24-HR COMPOSITE[4] |
| TOTAL PHOSPHORUS[13] (April 1-October 31) | 3.3 lbs/Day | **** | 0.2 mg/l | **** | Report mg/l | 2/WEEK | 24-HR COMPOSITE[4] |
| TOTAL PHOSPHORUS[13] (November 1-March 31) | 16.7 lbs/Day | **** | 1.0 mg/l | **** | Report mg/l | 2/MONTH | 24-HR COMPOSITE[4] |
| ORTHO PHOSPHORUS[13] (November 1-March 31) | Report lbs/Day | **** | Report mg/l | **** | Report mg/l | 2/MONTH | 24-HR COMPOSITE[4] |
| TOTAL NITROGEN[14] (May 1-October 31) | 133 lbs/Day | **** | 8 mg/l | **** | Report mg/l | 1/WEEK | 24-HR COMPOSITE[4] |
| TOTAL KJELDAHL NITROGEN | Report lbs/Day | **** | Report mg/l | **** | Report mg/l | 1/WEEK | 24-HR COMPOSITE[4] |
| TOTAL NITRATE + NITRATE | Report lbs/Day | **** | Report mg/l | **** | Report mg/l | 1/WEEK | 24-HR COMPOSITE[4] |
| WHOLE EFFLUENT TOXICITY [9, 10, 11, 12] | Acute LC50 ≥ 100% Chronic C-NOEC ≥ 83% | | | | | 4/YEAR | 24-HR COMPOSITE[4] |
| Hardness[15] | *** | *** | *** | *** | Report mg/l | 4/YEAR | 24-HR COMPOSITE[4] |
| Ammonia Nitrogen as N[15] | *** | *** | *** | *** | Report mg/l | 4/YEAR | 24-HR COMPOSITE[4] |
| Total Recoverable Aluminum[15] | *** | *** | *** | *** | Report mg/l | 4/YEAR | 24-HR COMPOSITE[4] |
| Total Recoverable Cadmium[15] | *** | *** | *** | *** | Report mg/l | 4/YEAR | 24-HR COMPOSITE[4] |
| Total Recoverable Copper[15] | *** | *** | *** | *** | Report mg/l | 4/YEAR | 24-HR COMPOSITE[4] |
| Total Recoverable Nickel[15] | *** | *** | *** | *** | Report mg/l | 4/YEAR | 24-HR COMPOSITE[4] |
| Total Recoverable Lead[15] | *** | *** | *** | *** | Report mg/l | 4/YEAR | 24-HR COMPOSITE[4] |
| Total Recoverable Zinc[15] | *** | *** | *** | *** | Report mg/l | 4/YEAR | 24-HR COMPOSITE[4] |

In an exemplary embodiment, input module 204 presents only one or a few monitoring requirements to the compliance officer at a time so as to simplify compliance with reporting and limit the ability of the compliance officer to inadvertently miss any one measurement. Input module 204 may also be configured such that the compliance officer cannot "skip" the input of required monitoring information. This configuration avoids the possibility of incomplete reporting. In this embodiment, and to enable the compliance officer to continue reporting in the instance in which a piece of monitoring equipment is malfunctioning or a value cannot be obtained in order to report, input module 204 may include an override control that permits non-entry of data under certain conditions. Input module 204 may also be configured such that input module will not allow a compliance officer to enter or modify input data related to a permit requirement of a permitted site unless the compliance officer is at the site. This configuration minimizes the opportunity for later revision or entering of an input data and thus possible fraud.

Input module 204 may also allow the compliance offer to designate a geolocatable place as a location, which may be useful for, for example, if the facility has multiple building sites which makes automatic recognition difficult or to indicate a precise location of a possible trouble area. The compliance officer may select or designate the location using computing device 104 by ways known in the art, such as, but not limited to, touching a spot on a touchscreen, voicing a command, directing a trackball, or using other devices in combination with a computer-based map program. For example, a compliance officer may designate the geolocatable place on the map program that is displayed on computing device 104 by moving an indicator of the program to the location of the place on the map, and registering the geolocation by clicking a mouse button, voicing the appropriate command, pressing the touchscreen, or otherwise so indicating his/her present location.

Input module 204 may also allow a compliance officer to include other related information to the geolocatable place. For example, a compliance officer may input a time of arrival at the place, an experience the compliance officer had at the place, the type of event occurring at the place, and the like. A person of ordinary skill in the art should understand that some examples of the aforementioned pieces of related information may be generated automatically when the compliance officer designates geolocatable place. For example, if the compliance officer designates a geolocatable place on computing device 104, e.g., by tapping a compliance officer interface element (such as a touchscreen displaying a map program) with a command such as "Record This," the computing device may concomitantly record a time-stamp associated with the designation. The data input by a compliance officer into input module 204 may be stored in a database (described further below with reference to FIG. 5) for later retrieval or processing.

Geolocation module 208, in an exemplary embodiment, is configured to automatically identify the location of the compliance officer, or act upon the request of the compliance officer via input module 204, so as to identify and/or record the location of a place, which in some embodiments may be a pair of coordinates (i.e., latitudinal and longitudinal) representative of a current location of the compliance officer, an address of a business, a building site, or other addressable or geolocatable place. It should be appreciated by those of ordinary skill in the art that location information may be obtained in a number of different ways. For example, location information may be identified using a mapping program, Internet-based or otherwise, IP address of a computer or wireless network, and other known means. In an exemplary embodiment, the location of the device (e.g., mobile device 120) indicates to PCS 200 which site, building, or location the compliance officer is at and the front-end application presents to the compliance officer, based upon his/her location, the items that require inspection at that time.

In an embodiment, computing device 104 (FIG. 1) includes technology for determining an address of an indicated place or ascertaining information associated with the indicated place using geolocation module 208. Computing device 104 can then communicate that information to another entity, or another entity may retrieve that data from the computing device. When computing device 104 communicates with another device (such as mobile device 120), the computing device is associated with identifying information such as addressing information, presence information, and the like. For example, computing device 104 can become associated with an internet protocol (IP) address, a MAC address, a network port, or any number of other types of addressing or locating information. IP addresses, MAC addresses, and others may be analyzed to ascertain information about the location of the computing device 104. Alternatively, computing device 104 can utilize an address associated with an internet service provider, a local area network, and the like.

PCS 200 can also compare the values input by the compliance officer or automatically received via a piece of monitoring equipment to limits in the appropriate permit via comparison module 212. In an exemplary embodiment, comparison module 212 determines the extent to which a permitted variable is exceeded. For example, if the permitted discharge for a given effluent source is X/gal/min, comparison module 212 can determine that a discharge rate of 2X/gal/min is two times the regulated limit. Comparison module 212 may also be designed and configured to do complex calculations required by the permit prior to comparing the inputted monitoring data with the permitted value. The output of comparison module 212 is comparison data that, depending on the value, can be transmitted for further action. For example, and as described in more detail just below, comparison data may be provided to prediction module 216 for further evaluation. Alternatively, comparison module 212 may, upon determining a possible violation (e.g., discharge above pre-determined parameters), transmit a warning or notice of the possible infraction to a decision maker, such as, but not limited to, in-house counsel, outside counsel, or a third-party response organization. In another embodiment, if noncompliance is determined by comparison module 212, a check-list or other representation of best practices/procedures (either preprogrammed or garnered from a third-party resource such as an environmental response firm) for dealing with the compliance issue may be presented to the compliance officer, who may then be able to address the noncompliance issue directly.

Prediction module 216 evaluates the comparison data from comparison module 212 and input module 204 and determines the likelihood of an enforcement action. Prediction module 216 may use several factors including, but not limited to or confined by, 1) the number of monitored parameters exceeded, 2) how severe the monitored parameter was exceeded (double, triple, etc.), 3) amount of time the aforementioned monitored parameters have been exceeded, 4) toxicity or dangerousness of the monitored parameter exceeded, 4) how often enforcement actions are taken against the relevant industry, 5) how often this particular permittee has had an enforcement action brought against them, 7) number of enforcement actions in the surrounding geographical area, 8) number of enforcement actions taken in that jurisdiction for similar noncompliance, 9) cost of enforcement actions for similar noncompliance (which could be a separate feature on its own), and 10) the speed with which noncompliance of this permittee in this instance was remedied.

The information used by prediction module 216 can come from a number of sources and databases. For example, information about a specific site may be complied within a database (not shown) of input data and comparison data that is kept by the permittee. Other information may be retrieved from public sources of information, such as, but not limited to, the U.S. Environmental Protection Agency's Enforcement and Compliance History Online (ECHO) Database.

After input data is evaluated by comparison module 212 and prediction module 216 (when implemented), relevant reports and or notifications may be delivered by reporting module 220. Reporting module 220 may allow for sorting, filtering, and displaying the data, comparisons, data trends, and alternative predications, as desired. If notifications are required based upon pre-determined criteria (either permit required or permittee requested), a notification can be immediately transmitted to the appropriate parties, including, but not limited to, an appropriate regulatory agency, a decision maker, and emergency personnel.

Reporting module 220 can include an authentication module 224. Authentication module 224 includes those standards and requirements that are necessary for the submission of reports in compliance with a regulatory agency (e.g., Environmental Protection Agency). In an embodiment of PCS 200, authentication module 224 may accompany a report of the compliance data generated by reporting module 220 when the report is delivered to a decision maker with the responsibility of submitting data to the regulatory agency. In this embodiment, the decision maker can, after reviewing the report, use authentication module 224 to submit the compliance data to the agency. Reporting module 220 may also be configured to allow for internal compliance audits. Moreover, and if desired, some or all of the data reportable by reporting module 220 may be available to outside entities. For example, an organization may choose to make its compliance history publically available and searchable by location.

One or more of the modules discussed herein may also be configured to determine the availability of any unused discharge credits nearby and suggest the purchase and or sale of credits (while still remaining in overall compliance, for example, remaining in compliance with the Water Quality Standard for that water body and the TMDL (Total Maximum Daily Load) if one has been set for that water body). This information may be transmitted to the decision maker along with any report or notice of noncompliance so that the decision maker has a fuller understanding of his/her available optioning in addressing discharge situations. In an exemplary embodiment, the decision maker can purchase or sell discharge/emission credits possessed by other permitted entities using PCS 200, by for example, communicating via system 100. For example, if a permitted entity has unused discharge/emission credits, the decision maker may offer for sale those unused credits through system 100. If a permitted entity has exceeded its discharge/emission parameters, for example, when notified by comparison module 208, the permitted entity may purchase credits from those offering credits for sale. Accordingly, decision makers can buy and sell credits after receiving notifications, after reporting noncompliance, after authenticating the data transfer as described above, and at other times. In another exemplary embodiment, PCS 200 may determine to whom unused credits should be offered for sale based upon the location of the permit, thereby facilitating the transfer of credits among similarly situated permitted entities. In this embodiment, PCS 200 may display the credits in a reporting module (similar to reporting module 220) of other similarly situated permitted entities, enabling an otherwise out of compliance permitted entity to attain compliance by purchasing unused credits from other permitted entities within an appropriate geographical area. The entire transaction between permitted entities may take place within PCS 200 by linking financial accounts so that payment can be debited and credited to the appropriate parties at the time of the transaction. Alternatively, an escrow account may be established so that money is placed by permitted entities from which credit purchases can be debited, and credit sales can be added.

Figure 3A:
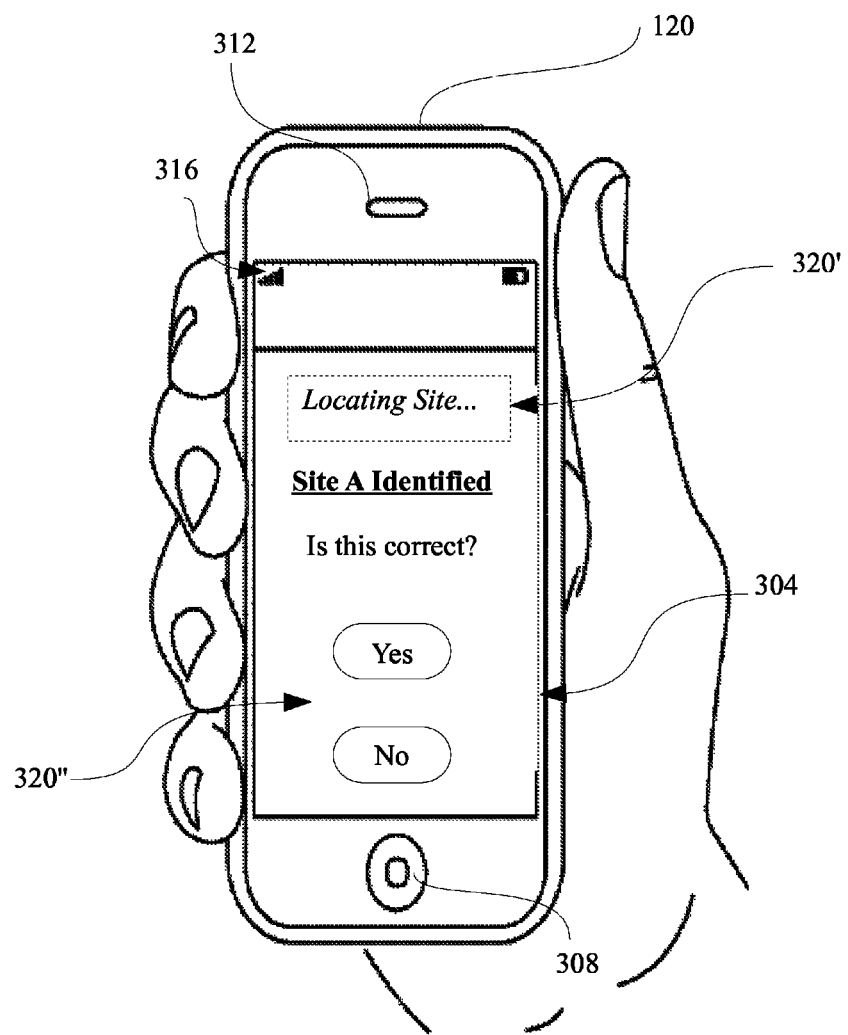
FIGS. 3A-3C are schematics of a mobile device for use with a PCS according to an embodiment of the present invention.
Figure 3B:
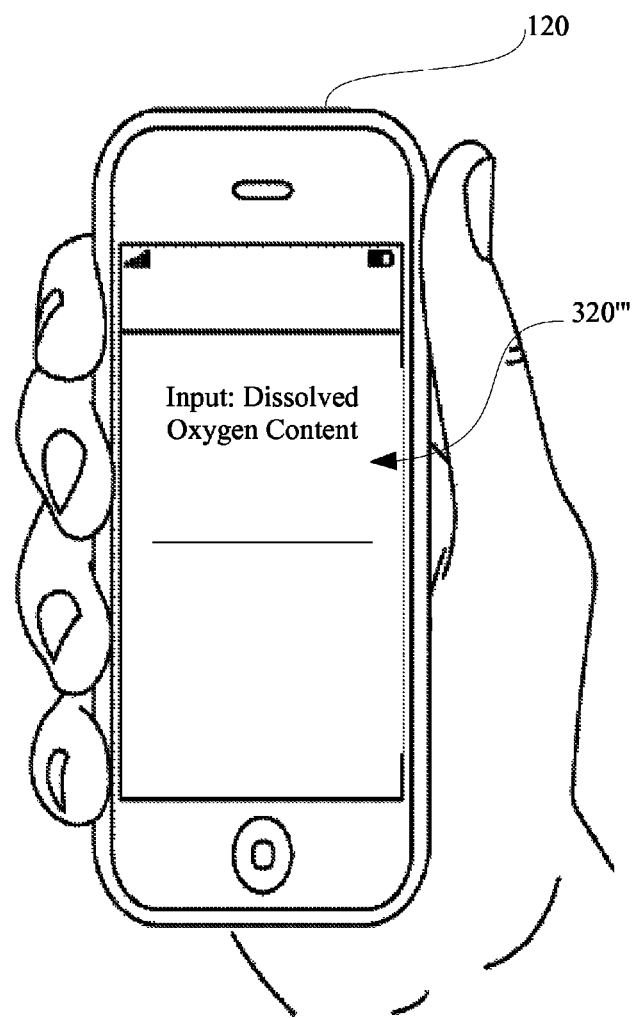
Figure 3C:
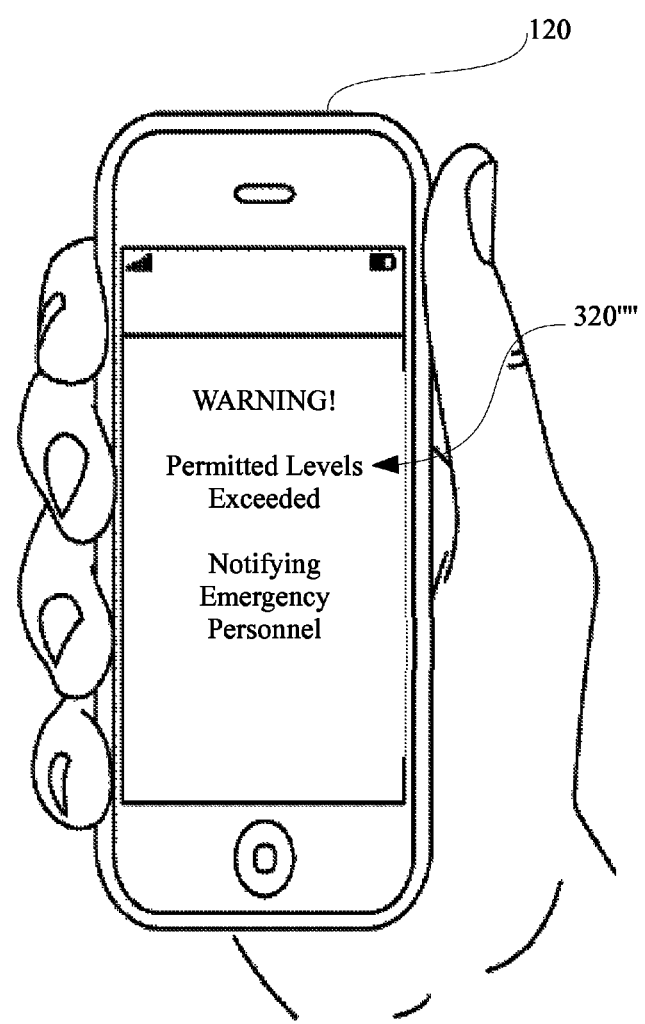

Turning now to FIGS. 3A-C, there is shown an implementation of a mobile device 120 (FIG. 1) suitable for use with PCS 200. Mobile device 120 can include a touch-sensitive display 304, an input device 308, a speaker 312, and a transceiver 316. Touch-sensitive display 304 is sometimes called a "touch screen" for convenience, and may also be known as or called a touch-sensitive display system. Touch screen 304 can be used to display information or to provide compliance officer-interface objects 320 (e.g., virtual (also called "soft") control keys, such as buttons or keyboards), thereby providing an input interface and an output interface between mobile device 120 and a compliance officer. Information displayed by touch screen 304 can include graphics, maps, text, icons, video, and any combination thereof (collectively termed "graphics"). In an embodiment, and in use with PCS 200, a compliance officer can select one or more compliance officer-interface objects 320, e.g., object 320', using touch screen 304 to designate that mobile device 120 is at the appropriate location.

Touch screen 304 has a touch-sensitive surface, which uses a sensor or set of sensors to accept input from the compliance officer based on haptic and/or tactile contact. Touch screen 304 may use LCD (liquid crystal display) technology, or LPD (light emitting polymer display) technology, although other display technologies may be used in other embodiments. Touch screen 304 can detect contact (and any movement or breaking of the contact) on the touch screen and converts the detected contact into interaction with compliance officer-interface objects (e.g., one or more soft keys, icons, web pages or images) that are displayed on the touch screen. Touch screen 304 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 304. In an exemplary embodiment of the use of mobile device 120, a compliance officer presses a finger to touch screen 304 so as to initiate contact. In alternative embodiments, a compliance officer may make contact with touch screen 304 using any suitable object, such as, but not limited to, a stylus.

Input device 308 facilitates navigation among and interacts with one or more compliance officer-interface objects 320 displayed in the touch screen 304. In an embodiment, input device 308 is a click wheel that can be rotated or moved such that it can be used to select one or more user-interface objects 320 displayed on touch screen 304. In an alternative embodiment, input device 308 can be a virtual click wheel, which may be either an opaque or semitransparent object that appears and disappears on the touch screen display in response to compliance officer interaction with mobile device 120.

Transceiver 316 receives and sends signals from mobile device 120. In an embodiment of mobile device 120, transceiver 316 sends and receives radio frequency signals through one or more communications networks, such as network 108 (FIG. 1), and/or other computing devices, such as computing device 104. Transceiver 316 may be combined with well-known circuitry for performing these functions, including, but not limited to, an antenna system, one or more amplifiers, a tuner, one or more oscillators, a digital signal processor, a CODEC chipset, a subscriber identity module (SIM) card, and a memory. As mentioned above, transceiver 316 may communicate with one or more networks, such as the Internet, also referred to as the World Wide Web (WWW), an intranet and/or a wireless network, such as a cellular telephone network, a wireless local area network (LAN), and/or a metropolitan area network (MAN), and other devices. Mobile device 120 may use any of a plurality of communications standards to communicate to networks or other devices with transceiver 316. Communications standards, protocols and technologies for communicating include, but are not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), WiMAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol.

Transceiver 316 may also be configured to assist mobile device 120 in determining its current location. For example, geolocation module 208 (FIG. 2) can direct transceiver 316 to provide signals that are suitable for determining the location of mobile device 120, as discussed in detail above. As shown in FIG. 3A, mobile device 120 can indicate that it is searching for the current location and relevant permitting information (e.g., interface object 320'). Mobile device can also request input from the compliance officer as to whether or not it has identified the correct location at interface object 320". The compliance officer can then indicate, using touch-screen 304 or other means, such as voice activation, that the geolocation module 208 has identified the appropriate location.

Mobile device 120 may also include other applications or programs such as, but not limited to, word processing applications, JAVA-enabled applications, encryption, digital rights management, voice recognition, voice replication, and a browser module. The browser module may be used to browse the Internet, including searching, linking to, receiving, and displaying web pages or portions thereof, as well as attachments and other files linked to web pages.

It should be appreciated that the mobile device 120 is only one example of the mobile device that may be used with the present system and method, and that the mobile device may have more or fewer components than mentioned, may combine two or more components, or a may have a different configuration or arrangement of the components. In the present system and method, mobile device 120 may be implemented with any computing device that includes geolocation functionality and is not so large that it is very inconvenient to move it from one location to another. Thus, mobile device 120 is not restricted to a smartphone or other hand-held device, and may include pad or tablet computing devices, smart books, net books, laptops, and even larger computing devices with geolocation functionality that may be moved from one location to another without significant inconvenience.

FIG. 3B shows an illustration of a mobile device 120 displaying another interface object 320, input request 320'''. Input request 320''' will vary based upon the input data required under the permit at the site/location. As discussed above, only a limited number of input requests 320''' may be presented on mobile device 120 at a time, which can help assure compliance with obtaining all necessary data to be reported.

FIG. 3C shows an illustration of a mobile device 120 displaying another interface object 320, warning 320''''. Warning 320'''' may be presented when an input data/value exceeds a permitted parameter. Warning 320'''' may be accompanied by the sending of a message to the appropriate persons/agencies and can serve to warn the compliance officer of a condition that may warrant immediate action by the officer.

Figure 4:
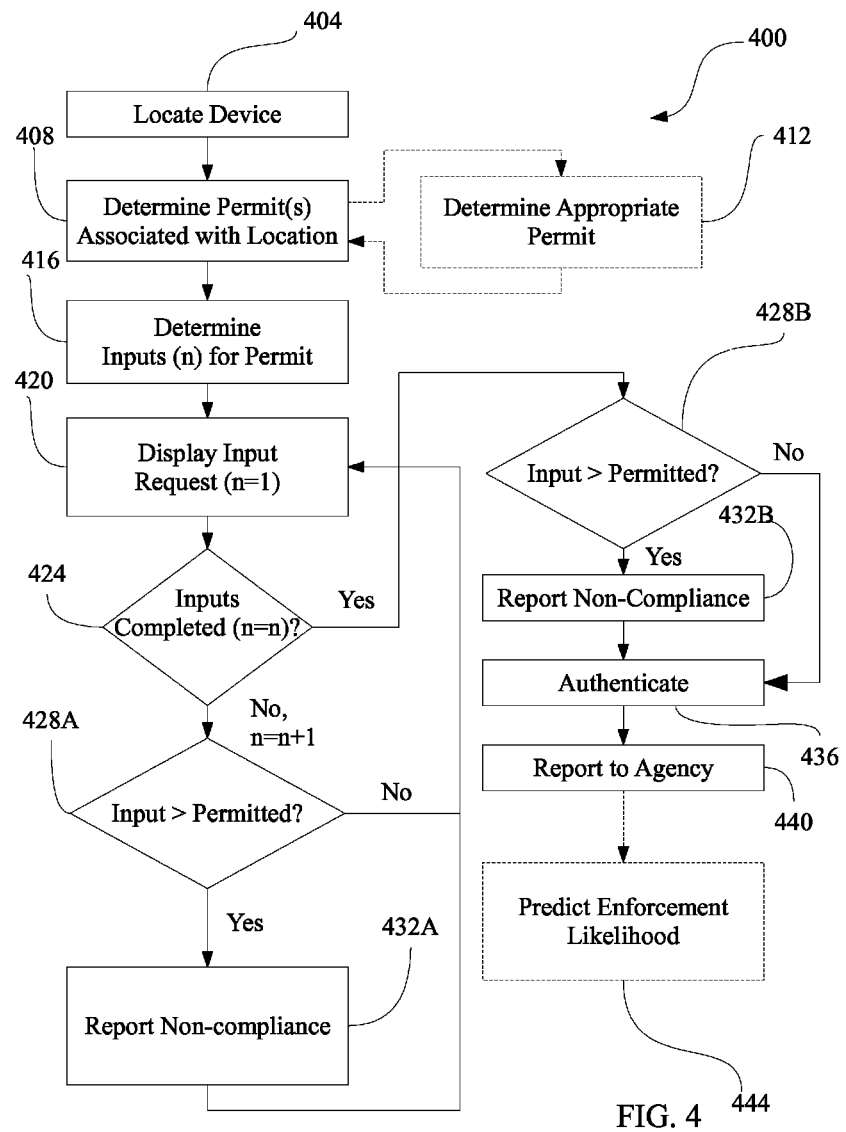
FIG. 4 is a flow diagram of a method of conducting permit compliance according to embodiment of the present invention.

FIG. 4 is a process diagram of an exemplary monitoring, comparing, and reporting system 400 according to an embodiment of the present invention.

At step 404, a location of the computing device is determined. The location of the computing device may be determined as discussed above, for example, by using geolocation module 204. The location may refer to, for example, an area (such as a lagoon or stream), a building, a complete organization site, or a partial site.

At step 408, a permit associated with the location is determined. In certain circumstances, more than one permit may be associated with a given location. In this situation, process 400 may request compliance officer input at step 412 so as to determine the appropriate permitting information for the process.

At step 416, the permit is evaluated to determine the inputs required to satisfactorily complete monitoring compliance. This evaluation takes into account the possibility that certain monitoring requirements of a given permit may not be required at the same intervals as other requirements. For example, and as shown in FIG. 3, certain parameters are measured daily, others are measured weekly, and others are measured monthly.

At step 420, an input request is displayed for the compliance officer based upon the determinations made at step 416. In this embodiment, the compliance officer is required to input data relevant to the input request before being allowed to review and provide input to another input request. In another embodiment, more than one input request may be made at step 420.

At step 424, a determination as to whether any additional measurements are required under the permit. If additional measurements are required, the process proceeds to step 428A, if not, the process proceeds to step 428B. In both 428A and 428B, the input data from the compliance officer is compared to the permitted value (such as a discharge value). If the input data exceeds the permitted value, process 400 proceeds to either step 432A or 432B (respectively), which reports the non-compliance. In an embodiment, steps 432A or 432B evaluates what type of reporting needs to be performed. For example, for some types of substances, occasionally exceeding a permitted value may be allowable, while in other instances, such as toxic chemicals, there may be no allowance for exceeding the permitted value. These different situations may result in different reporting requirements that dictate who needs to be contacted, how soon they need to be contacted, and other immediate/subsequent steps to take.

If the input data does not exceed the permitted value, process 400 returns to step 420, which returns another input request from the same permit until there are no further items subject to monitoring under the permit.

Once all permit inputs are completed by the compliance officer, the data is presented for authentication at step 436, by for example, authentication module 228. Authentication ensures that the data is submitted to the designated agency by a person with the right and responsibility to do so. At step 440 the authenticated data is reported out to the designated agency.

Optionally, at step 444, a prediction as to the likelihood of an enforcement action is provided. A prediction can be determined as provided above with regards to prediction module 216. The prediction may also be a part of any report generated at step 432A or 432B.

Process 400 may be repeated for any number of permits at a given site.

Figure 5:
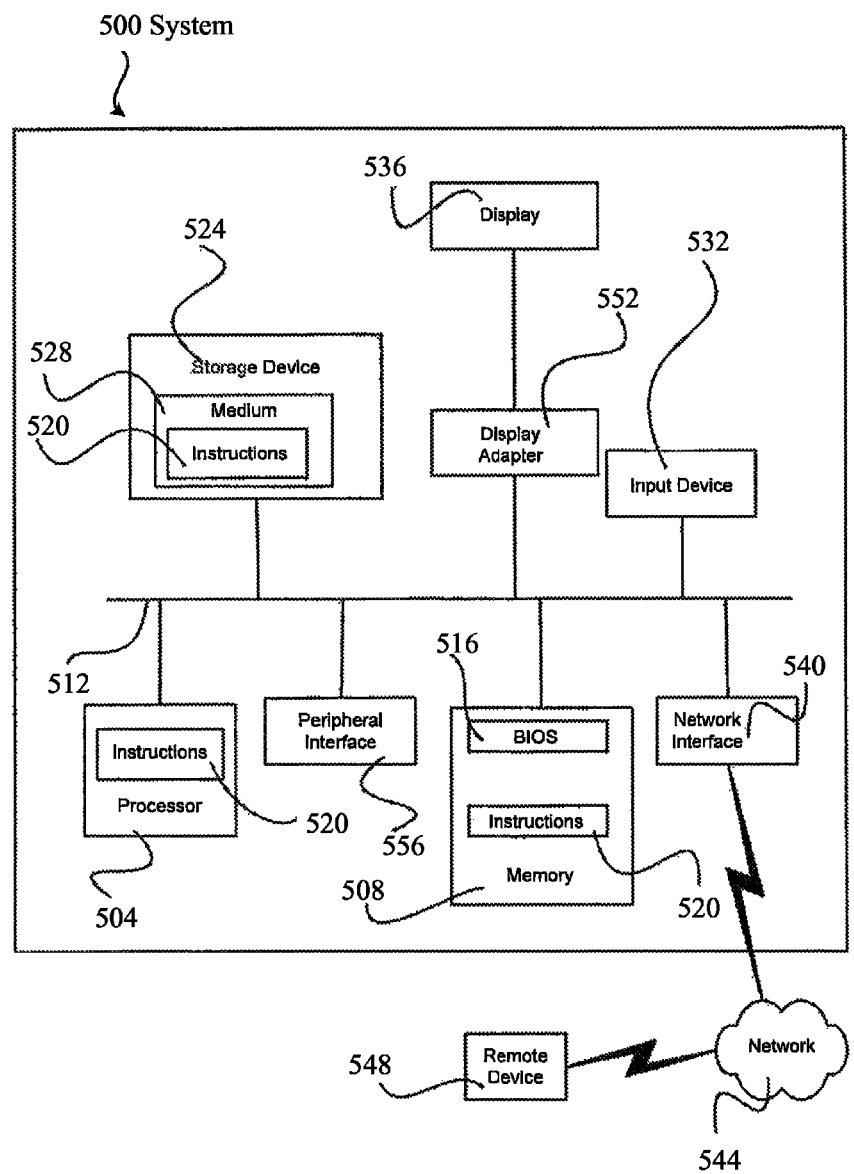
FIG. 5 is a schematic representation of a computer system suitable for use with the PCS according to an embodiment of the present invention.

FIG. 5 shows a diagrammatic representation of one embodiment of computing system 100 in the exemplary form of a system 500, e.g., computing device 104 or mobile device 120, within which a set of instructions for causing a processor 504 to perform any one or more of the aspects and/or methodologies, such as process 400, of the present disclosure. It is also contemplated that multiple computing devices, such as computing device 104, or mobile devices 120, or combinations of computing devices and mobile devices, may be utilized to implement a specially configured set of instructions for causing PCS 200 to perform any one or more of the aspects and/or methodologies of the present disclosure.

System 500 can also include a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 516 (BIOS), including basic routines that help to transfer information between elements within system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

System 500 may also include a storage device 524, such as, but not limited to, the machine readable storage medium described above. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with system 500 (e.g., via an external port connector (not shown)). Particularly, storage device 524 and an associated machine-readable medium 528 may provide nonvolatile and/or volatile storage of machine-readable instructions, data structures, program modules, and/or other data for system 500. In one example, software 520 may reside, completely or partially, within machine-readable medium 528. In another example, software 520 may reside, completely or partially, within processor 504.

System 500 may also include an input device 532. In one example, a user of system 500 may enter commands and/or other information into system 500, for example using input device 208, via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to system 500 via storage device 524 (e.g., a removable disk drive, a flash drive, etc.) and/or network interface device 540. A network interface device, such as network interface device 540 may be utilized for connecting system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network, a telephone network, a data network associated with a telephone/voice provider, a direct connection between two computing devices, and any combinations thereof. A network, such as network 544, may employ a wired and/or a wireless mode of communication. In general, any network topology may be used. Information (e.g., data, software 520, etc.) may be communicated to and/or from system 500 via network interface device 540.

System 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. In addition to a display device, a system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A permit compliance system for monitoring a site's compliance with one or more permits limiting or controlling the activities and/or discharges from the site, the permit compliance system comprising:
   a mobile compliance device having a processor and a non-transitory computer readable medium in communication with said processor, wherein said non-transitory computer readable medium includes:
      an input module configured to:
         determine a location of said mobile compliance device;
         present to a user one or more permit limitations associated with a permitted discharge proximate said location, wherein each of said one or more permit limitations includes a permitted discharge value; and receive data for said permitted discharge representing an actual discharge only when said mobile compliance device is proximate said location;

a comparison module configured to determine a difference between said actual discharge with said permitted discharge value;

a prediction module configured to determine a likelihood of an enforcement action based upon said difference; and a reporting module configured to evaluate said difference and to transmit information related to said actual discharge to certain site personnel needing to know said information, wherein said reporting module is further configured to access a database that includes information related to compliance credits and to purchase said compliance credits related to said actual discharge and said difference.

2. A permit compliance system according to claim 1, wherein said input module is further configured to present each of said one or more permit limitations as determined by the location of said mobile compliance device relative to the longitude and latitude of said permitted discharge.

3. A permit compliance system according to claim 1, wherein said input module is further configured such that no alterations to received data are permitted after said mobile compliance device is no longer at the location of the received data.

4. A permit compliance system according to claim 1, wherein said comparison module is further configured to determine an extent of said actual discharge based upon said difference.

5. A permit compliance system according to claim 4, wherein said comparison module is further configured to provide a set of remedial instructions to a user of the system, wherein said set of instructions are based upon said extent of said actual discharge.

6. A permit compliance system according to claim 4, wherein said likelihood is based upon two or more considerations, said considerations including: a number of exceeded permit limitations; said extent; an amount of time of said exceeded permit limitation; a toxicity or dangerousness of said exceeded permit limitation; how often enforcement actions are taken against industries related to the site; how often the site has had an enforcement action brought against it; number of enforcement actions in the surrounding geographical area; number of enforcement actions taken in that jurisdiction for similar noncompliance; cost of enforcement actions for similar noncompliance as said exceeded permit limitation; and the speed with which the site remedies said exceeded permit limitation.

7. A permit compliance system according to claim 4, wherein said likelihood is based upon three or more considerations, said considerations including: a number of exceeded permit limitations; said extent; an amount of time of said exceeded permit limitation; a toxicity or dangerousness of said exceeded permit limitation; how often enforcement actions are taken against industries related to the site; how often the site has had an enforcement action brought against it; number of enforcement actions in the surrounding geographical area; number of enforcement actions taken in that jurisdiction for similar noncompliance; cost of enforcement actions for similar noncompliance as said exceeded permit limitation; and the speed with which the site remedies said exceeded permit limitation.

8. A permit compliance system according to claim 1, wherein said prediction module is further configured to provide a cost of non-remedial action related to said actual discharge.

9. A permit compliance system for monitoring, reporting, and complying with permit limitations related to a site or a permitted discharge, the permit compliance system comprising:

a mobile compliance device having a processor and a non-transitory computer readable medium in communication with said processor and including:
an input module configured to determine a location of said mobile compliance device and one or more permits related to said location, and
a comparison module configured to determine a difference between said discharge with a permitted discharge value;
wherein said mobile compliance device configured to receive information related to a discharge;

a database in communication with said mobile compliance device, said database including:
one or more permits related to the site or the permitted discharge;
records relating to past discharge activity at the site; and
compliance credits earned or owned by the site; and a reporting system in communication with said mobile compliance device and said database, said reporting system configured to:
determine the existence of a discharge event;
predict a likelihood of an enforcement action based upon said discharge event and said records;
determine remedial steps based on said discharge event; and
transmit information related to said discharge event and said remedial steps.

10. A permit compliance system according to claim 9, wherein said non-transitory computer readable medium includes a prediction module configured to determine a likelihood of an enforcement action based upon said difference.

11. A permit compliance system according to claim 9, wherein said reporting system includes a comparison module configured to determine a difference between said discharge with a permitted discharge value.

12. A permit compliance system according to claim 11, wherein said non-transitory computer readable medium includes a prediction module configured to determine a likelihood of an enforcement action based upon said difference.

13. A permit compliance system according to claim 9, wherein said results system is further configured to determine a cost of non-remedial action related to said discharge event.

14. A permit compliance system according to claim 9, wherein said reporting system is further configured to include a reporting module, said reporting module being further configured to access said database that includes information related to compliance credits.

15. A permit compliance system according to claim 14, wherein said reporting module is further configured to purchase said compliance credits related to said actual discharge and said difference.

* * * * *

UNITED STATES PATENT AND TRADEMARK OFFICE
CERTIFICATE OF CORRECTION

Page 1 of 1

PATENT NO. : 9,652,724 B2
APPLICATION NO. : 14/454458
DATED : May 16, 2017
INVENTOR(S) : James Tyler Ward, II It is certified that error appears in the above-identified patent and that said Letters Patent is hereby corrected as shown below:

In the Specification

Column 8, Line 39, replace "4)" with --5)--
Column 8, Line 40, replace "5)" with --6)--
Column 9, Line 27, replace "208" with --212--
Column 12, Line 10, replace "204" with --218--
Column 12, Line 24, replace "FIG. 3" with --the tables above--
Column 12, Line 35, insert the words --is made.-- between the words "permit" and "If"
Column 13, Line 60, replace "208" with --308--

Signed and Sealed this
Eleventh Day of September, 2018

Andrei Iancu
*Director of the United States Patent and Trademark Office*